US006598028B1

(12) United States Patent
Sullivan et al.

(10) Patent No.: US 6,598,028 B1
(45) Date of Patent: Jul. 22, 2003

(54) COMPUTER-IMPLEMENTED UNIVERSAL FINANCIAL MANAGEMENT/TRANSLATION SYSTEM AND METHOD

(75) Inventors: Lynn Sullivan, 14 Peach Orchard La. Rte. 628, Washington, VA (US) 22747; John Jedlicka, Dunwoody, GA (US); Alan Rosenberg, Newtown Square, PA (US)

(73) Assignee: Lynn Sullivan, Washington, VA (US)

( * ) Notice: Subject to any disclaimer, the term of this patent is extended or adjusted under 35 U.S.C. 154(b) by 0 days.

(21) Appl. No.: 09/431,175

(22) Filed: Nov. 1, 1999

Related U.S. Application Data

(60) Provisional application No. 60/152,235, filed on Sep. 3, 1999.

(51) Int. Cl.[7] .............................................. G06F 17/60
(52) U.S. Cl. ........................... 705/35; 705/26; 705/36; 705/37
(58) Field of Search .............................. 705/35, 36, 37, 705/26

(56) References Cited

U.S. PATENT DOCUMENTS

| | | | | |
|---|---|---|---|---|
| 5,993,047 A | * | 11/1999 | Novogrod et al. .......... 700/231 |
| 6,064,981 A | * | 5/2000 | Barni et al. .................... 705/26 |
| 6,073,116 A | * | 6/2000 | Boyle ........................... 705/36 |
| 6,076,113 A | * | 6/2000 | Ramanathan et al. ........ 370/229 |
| 6,188,993 B1 | * | 2/2001 | Eng et al. ...................... 705/35 |
| 6,199,046 B1 | * | 3/2001 | Heinzle et al. .............. 345/808 |
| 6,206,283 B1 | * | 3/2001 | Bansal et al. ................ 235/379 |
| 6,305,603 B1 | * | 10/2001 | Grunbok et al. ............. 235/379 |
| 6,394,343 B1 | * | 5/2002 | Berg et al. ................... 235/379 |

FOREIGN PATENT DOCUMENTS

| | | | |
|---|---|---|---|
| JP | 5-342443 | * | 12/1993 |
| WO | WO 99/24921 | * | 5/1999 |

OTHER PUBLICATIONS

Mandell, Mel. The Check's In the . . . Internet. World Trade. Oct. 1998.*

* cited by examiner

*Primary Examiner*—Kenneth R. Rice
*Assistant Examiner*—James S. McClellan

(57) ABSTRACT

A central-based universal financial management/translation mechanism that offers individual users, small businesses and others, the opportunity to leverage competitive market forces in the currency trading arena, offered as a real-time account-feature for transactions conducted through the centrally oriented universal financial management/translation mechanism.

1 Claim, 5 Drawing Sheets

COMPUTER-IMPLEMENTED UNIVERSAL FINANCIAL MANAGEMENT/TRANSLATION SYSTEM AND METHOD

CROSS REFERENCE TO RELATED APPLICATION

The present document claims the benefit of the earlier filing date of, and contains subject matter related to that disclosed in, co-pending provisional patent application U.S. Serial No. 60/152,235, filed on Sep. 3, 1999, entitled "COMPUTER-IMPLEMENTED UNIVERSAL FINANCIAL MANAGEMENT/TRANSLATION SYSTEM AND METHOD", with first named inventor being Lynn Sullivan.

BACKGROUND OF THE INVENTION

1. Field of the Invention

The present invention relates to systems and methods that include mechanisms for facilitating international trade and investment involving conversion of currencies.

2. Discussion of the Background

Mutual Funds

As presently recognized there is a growing market for international, financial and wealth management products that can be conveniently accessed and combined with "needs based" collateral services. Small business and individuals continue to recognize the benefits and low cost entry of investing, as well as traveling and conducting international business transactions. In response, many developed and emerging market countries have relaxed regulatory barriers to incoming and outgoing capital flows.

As a result, the demand for well-structured, pooled investment products is likely to accelerate, due to many macroeconomic and political factors. These include, firstly, the trend to restructure welfare and retirement programs to place more reliance on investor directed plans and less on state managed programs. A second important factor is the growth of developing countries. As countries relax their barriers to capital flows in order to become more competitive in attracting international capital, local markets are expanding at a rapid pace. With this expansion comes growing wealth and a demand for professionally managed investment products wrapped with fee based investment, or financial planning services. Due to their structure, mutual funds are natural investment vehicles for local investors in these markets.

Offshore Investment Funds

Conservative estimates put $5 trillion in banks, mutual funds, and trusts in the world's international offshore banking centers. These centers have no or low taxes, flexible regulations, and, quite often, strict secrecy laws designed to attract capital. As the economy has gone global, corporations have increasingly used these centers to stay competitive, making them especially attractive for money market mutual funds and bank sweep services. Valued at $2.4 trillion, offshore funds now account for almost half the mutual funds sold worldwide, with their chief selling point being higher-than-average yields.

As a result, most of the major mutual fund groups in the U.S. and Europe either have or are in the process of developing a family of offshore funds. Typically, they are cloning existing domestic funds, and wrapping these products with various collateral services, such as check writing on money market mutual funds, daily sweep services, or free exchange amongst a "family of funds."

U.S. Financial service companies seeking to expand market share in Europe, or elsewhere, understand that without a proper distribution strategy, their initiatives will fail. Distribution options include building a captive sales force, "renting" an established channel, forging an alliance with a foreign investment manager to cross-distribute products, buying a foreign distribution channel and/or investment manager, or "going direct." Each of these options has its own characteristics and concerns, but perhaps the most difficult is direct distribution. Gaining access to an existing source of distribution is by far the most desirable method, although cost is a key consideration. Many consider that the easiest part is deciding the correct product type or investment style. However, these financial service companies understand that product structure and design, including management, other fees, and its supporting technology are extremely important in ensuring maximum competitive advantage and profitability for their offshore financial products. For example, the typical fund group will build on its domestic product strengths, whether equity or fixed income funds, or global, regional or single country funds. Innovation beyond this limited scope is typically not the mandate for busy fund company executives.

Administrative and technological considerations are often overlooked until late in the development process, although it is understood by the financial institutions offering these products that they are extremely important for certain products. In fact, it can be the deciding factor in selecting a particular jurisdiction, because of time zone problems or the quality of accounting or transfer agent systems of a particular fund Administrator. Many fund Administrators serving the offshore market are now establishing subsidiaries in at least one location within the three offshore regions of Europe (preferably in a UCITs qualifying EU country), the Caribbean and the Asia-Pacific region. Beyond mutual funds products which require relatively sophisticated systems and experienced agents include mortgage-backed securities, commodity funds, funds investing in LDC debt and bank loans, limited partnerships with complex allocation structures, hedge funds, funds qualifying as passive foreign investment companies and funds requiring retail transfer agent capabilities. In addition, the regulatory authority may require that certain functions are performed within the domicile, thereby eliminating it as a viable option for certain types of funds if the most experienced agents are located elsewhere.

Currency Facilities and Foreign Exchange Services

The beginnings of a common European market goes back several decades but had not moved markedly until the early 1990s. The European Community has given way to the European Union (EU). And the development of a single currency for the 250 million residents of the EU, the Euro, has created a pressing need for financial and investment products that can serve the needs of the Continent's small-to-medium-sized business market.

There is not a market, as we know it, for currencies, but rather an informal network of trading desks at investment houses, multi-national corporations, and commercial banks. Currency prices are based on certain assumptions, including trends in trade data, interest rates, and political developments.

Until recently, spot currency trading was dominated by major institutional Dealers and Brokers. With the advent of Electronic Dealing Systems (EDS,) the major Dealers no longer control price discovery. In fact, the buyer side represented by pension funds, and retail mutual funds, and aided by Foreign Exchange transaction systems, are the new market makers. Consequently, the major players are focusing more on derivative trades to make money. Second, elimination of intra-European currency trade will temporarily reduce overall Foreign exchange volumes by 07–10% in the near future. Third, Internet based spot, currency trading systems are now being aggressively sold to individuals.

As presently recognized, with minimum account balances as little as $3,000.00, five-point spreads, and low commissions per lot and per round turn, inter-bank market exchange fees, this could be as popular as on-line stock trading has become. So the time has arrived to offer these services bundled in a structure that is trusted, convenient, and that brings efficient currency price discovery to the masses. The money market mutual fund structure and credit/debit cards come to mind. It is our observation that traditional sources of foreign exchange for small and medium size business that conduct cross border business transactions, will need to re-align themselves with these obvious trends.

Businesses in the Euro area are changing to prepare for a more competitive environment. The impact of the Euro currency can be detected in a string of events, ranging from the restructuring plans at multinationals such as Germany's Siemens, to actions such as the takeover of Belgium's BBL bank by ING of the Netherlands. As the single currency transmits and amplifies competitive pressures across the Euro area, more of the same can be expected. Price transparency and the elimination of foreign-exchange costs and risks will have strategic implications in three main areas in particular: in pricing, in supplier relationships and in internal Organization and investment.

Second, travel and education are enlarging tastes of individuals in the U.S. and all over the continent, but regional differences remain'strong. Even the new "international" cuisine finding its way on to supermarket shelves often has a strongly regional flavor: Heinz's baked bean pizza is unlikely ever to find favor beyond the shores of the British Isles. Without currencies to define boundaries, marketing regions will be less tied to national borders than today, following instead the logic of distribution, or of culture. Northeastern France, for instance, might be lumped with French-speaking southern Belgium rather than with southwestern France, which has more in common with the Basque region of Spain. Jan Kaas, treasurer of Unilever, points out that there are almost no Europe-wide products-even a brand such as Magnum ice-cream, which is marketed in a similar way across Europe, tastes different in different parts of the continent. Those products that are universally adored, such as Coca-Cola or Bruce Willis, tend to be global, not exclusively European.

Firms risk losing a key source of their profitability if their power to charge different amounts in different markets is eroded. Pricing strategy needs care if firms are not to throw away the profits they make through higher margins in some markets than others. For example, in the automotive-parts business, a 1% change in price can translate into a 10–15% change in profits, according to McKinsey & Company, a consulting firm. Lehman Brothers calculates that, if all car prices in the Euro area fell to the lowest levels, the revenues of France's Peugeot CSA and Renault groups would fall by 12% and 9% respectively.

It is our observation, that it is increasingly difficult to keep customers in the dark on underlying costs associated with goods and services. As communication technology sheds light on everything going on next door, businesses are being boxed in by customers brandishing price lists for particular goods or services found by searching the Internet. The foreign exchange cost associated with the sale or purchase of goods and services will make or break many small and medium size businesses that depend to a large extent on cross border business transactions. It is also unlikely, that high net worth travelers will continue to tolerate excessive foreign exchange fees on their credit cards, if there were a reliable, alternative.

Credit and Debit Card Systems

In conjunction with these developments are the exponential growth of credit and debit cards, and the implications that this type of financial product will have on world capital flows in the near term. Today, consumers are demanding safe, secure access to their money anytime, anywhere and new applications of technology are making it possible to accommodate these consumer demands.

Integrated circuits enable multi-application, multifunction cards that the bank can use to protect and expand its retail and business customer relationships. At the same time, expanded networks that offer connectivity through remote delivery channels, such as telephones, cable television, and satellites, are supporting the expansion of card usage beyond the store and into the home, office, car and plane. The migration of transaction activity toward these new access options, which are chosen by the consumer (business or retail), rather than by the bank or merchant, is transforming the point of sale into the point of interaction. Industry projections indicate a continued shift towards the convenience of plastic. The bank of the future, including its debit or credit card, will be built on many applications, with needs being defined by the consumer.

FIG. 1 shows how transactions involving currency conversion are employed in transaction-based payment systems, such as credit card systems. As shown in FIG. 1, a variety of different entities are included in the "authorization" and "clearing and settlement" processes associated with employing a transaction payment system that requires currency conversion. A user 1 communicates a purchase request message to a transaction terminal 3. This may occur as a local point of sale such as at a merchant's cash register. Alternatively, it may occur via mail order/telephone order, e-commerce-exchanges, or automated teller machine (ATM) transactions. The purchase request is then forwarded by the transaction terminal 3 in the form of an authorization request message (part 1) to a host processor 5. The host processor 5 is a local financial institution, for example, but could also be a third part processor such as a merchant or MOTO, like First Data Corporation. The purpose of the authorization request (part 1), is for the host processor 5, which has a "local" relationship with the operator at the transactional terminal 3, but does not otherwise have a relationship with user 1 to relay the authorization request, as part 2, to an authorization system 7. This authorization system solicits information from the issuer of the card used by user 1, from the issuer's authorization system 9, perhaps through an optional request message to that issuer, or through internal records kept within the authorization system 7. The authorization system 7 includes networks such as MasterCard's Bank Net, Visa's VisaNet, or Europay's-EPCNet, for example. These authorization systems 7, are proprietary networks that operate within an intranet environment, not directly accessible by users 1. The authorization systems 7 are responsible for dispatching an accept/deny message to the host processor 5 that will ultimately be relayed to the transaction terminal 3 so that the transaction between the transaction terminal 3 and user 1 may be completed. However, after the transaction has been completed a relatively significant time delay exists from the time that the transaction is completed until the time the settlement process has finished.

Moreover, after the user 1 walks away from the point of sale, the transaction terminal 3, is then responsible for submitting transaction information in the form of drafts or electronic draft captures (EDC) to the host processor 5. The host processor 5 then gathers and accumulates different drafts and EDCs, and sends them (perhaps over the course of days) in a remittance/settlement request to the payment association network 11. The payment association network 11 performs the operation of clearing the transaction, making a conversion from one currency to the next, presumably at a preferred conversion rate, and makes the appropriate deposits within the associated settlement accounts. On average for US transactions, the internal communication settlement, management and clearing process performed at the payment association network 11 takes over two days to complete. In other parts of the world it may take substantially longer. Subsequently, at the conclusion of the settlement process, the payment association networks 11 disperses settlement messages to the issuer authorization system 9 and host processor 5.

As presently recognized by the inventors, the above-described system, does not provide the user 1 nor the transaction terminal 3 with real-time, or even nearly real-time information regarding particular conversion rates. Over the course of several days, conversion rates may change dramatically, and as a consequence the purchaser cannot be precisely sure exactly how much a particular transaction actually cost, because the conversion between currencies happens well after the transaction. Furthermore, the structure and operation of the system shown in FIG. 1, is based on a fairly ridged signaling mechanism provided by the different international authorization, clearing and settlement systems. The payment associations describe these process flows in detail for their members.

With regard to clearing and conversion, wholesale rates are used to convert transaction currency to U.S. dollars. These rates may be adjusted upwards by as much as 3% at the discretion of the payment association and the bank issuing the card. For example, based on conversations with bank customer service representatives, People Bank adds 1% while ATT Universal Card adds 3% to the wholesale rate.

Transaction Flows

The MasterCard International and Visa International authorization systems are similar in function and can be described generically as follows. They are international message processing systems that serve all of the association's members: large and small, automated and non-automated. The systems transmit authorization validation data among issuers, acquirers, and points of interaction (merchant point of sale—POS, ATMs, telephone, Internet, etc.).

The systems are composed of telecommunications networks that link each association's members and the association's data, processing centers, interface processors and software. The association's interface processors are communications processors that are located at an association member's facility, or at a processor site. The interface processors provide access to the association's telecommunications network.

Clearing and Settlement Systems

The MasterCard International and Visa International clearing and settlement processes (CSP) are similar in function and can be described generically as follows. Issuers and acquirers participate in clearing to exchange transaction data and participate in settlement to exchange funds. The issuer is the institution that issues MasterCard and/or Visa cards to cardholders. The acquirer is an association member that has agreements with merchants to accept card transactions from merchants and to reimburse merchants for those transactions. Clearing is the process whereby association members send records of payment transactions among participants to their respective association. The sending member sends transaction data to the association's central operations center and the association processes the data as they are received and distributes the data to the appropriate member(s) during several clearing cycles. The processing of these financial transactions is through the association's clearing systems. Settlement is the process of exchanging funds. The associations effect the exchange of funds each day on behalf of members for the net value of the financial transactions cleared for that day. Settlement funds represent the net monetary value from clearing processing. The processing and exchanging of funds is through the association's settlement system.

Deficiencies of Mutual Funds, Foreign Exchange Facilities, and Credit/Debit Cards The present inventors have identified that institutions that offer retail or institutional financial products and services, including mutual funds, foreign exchange, and credit/debit cards to high net worth individuals and small to medium size business, have failed to recognize the additional applications inherent in their financial products and thus have produced "systems" that are presently incapable of offering "real-time price discovery" for all interested entities. The present inventors have identified that institutions that offer retail or institutional financial products to high net worth individuals and small to medium size business, have failed to recognize that by not offering new applications for existing financial products supported by known, technologies, they are limiting the channels of distribution through which their products are offered. Traditional applications include investment advice, daily sweep services, check writing, lending, and currency exchange.

There are numerous factors as to why the existing systems are deficient, and why they have not been addressed at the board rooms of financial service companies.

Many of the major financial service companies that control market share for financial products, are publicly owned, and, as such, are more concerned about quarterly profits than what the consumer of their services might need or want. For example, the recent spate of Initial Public Offerings for mutual fund investment management companies, has enabled these companies to use stock "currency" to acquire their competitors. Very little attention has been paid to turning themselves into broad-based financial services company at the product level.

Financial service companies reward their employees for sales, not innovation or invention. In addition, compensation packages at major insurance companies and banks have not been comparable to the same at major brokerage and mutual fund companies.

Thanks to the eight-year bull market, senior and mid-level executives at leading financial service companies have been rewarded to such an extent that there is no incentive to invent.

The cultures of major financial service companies that have been traditionally service oriented, are not sales oriented, and financial service companies that have been traditionally sales oriented are still not service oriented although they pretend to be. Inventing new products requires an environment that fosters both cultures. This brings to mind various "wrap fee," financial consultant, and financial advisor programs fostered by major brokerage firms. Although firms like Merrill Lynch have aggressively pushed these programs, the turnover of their financial consultants has been extremely high.

In the last ten years, there has been an explosion of financial service products, creating a mind-boggling array of choices. People began to invest in mutual funds because it was too difficult to pick individual stocks on their own. Now, there are more mutual funds than individual stocks. The advent of investment planning has grown out of this problem, creating another layer of expense for the average investor.

The Internet, and various low-fee, on-line financial databases and services have exploded in the past two years. As a result, major brokerage firms have been forced to cannibalize their full service brokers, by offering the same services at a lower cost to their customer over the Internet.

Financial services companies have failed to recognize that they are essentially technology companies, and that their competition is companies like Microsoft, not other banks, brokerage, insurance or mutual fund investment companies.

Eventually all or most financial products and services will be sold and maintained over the Internet.

Technology companies have done a better job in providing consumers with needs based services associated with their financial and investment needs, giving end users greater flexibility, and control. Quicken Deluxe comes to mind.

Technology is dictating innovation and invention, not corporate policy. Take for example Motorola. They are now describing themselves as a software company rather than a telecommunications hardware company. Technology was responsible for the creation of Instinet, an after hours trading desk. The Internet provided the platform for E*Trade, a popular, Internet based discount brokerage company. On the trading side, OptiMark, a system that allows for anonymous stock price discovery directly between the buyer and seller has been facilitated by the increased usage of electronic communication systems, by "buy side" pension and mutual fund managers.

Credit card companies such as MasterCard or Visa are associations that are dominated by a handful of major commercial banks that prefer to drive innovation for their own businesses. They prefer that the associations provide minimal product development because of their fear that it would benefit their competitors.

SUMMARY OF THE INVENTION

An object of the present invention is to address the above and other identified limitations with conventional system and processes. This and other objects may be accomplished with the present invention, which includes a central-based universal financial management/translation mechanism that offers individual users, small businesses and others, the opportunity to leverage competitive market forces in the currency trading arena, offered as a real-time account-feature for transactions conducted through the centrally oriented universal financial management/translation mechanism.

The inventors have created a new type of financial management account system and method that integrates brokering and dealing, offshore investment funds, credit or debit card access, and low fee currency exchange. Initially this system and method combines a multi-currency money-market fund (open end investment company or unit trust), and a U.S. growth, equity fund, both tied to easy-to-use payment card access or virtual (computer-based) access. Subsequently, this system and methods may be licensed to any other type of open-ended investment company or unit trust, or licensed to any other type of cash deposit account offered by any financial institutions. The central mechanism provides European businesses (for example) with unparalleled convenience, money management and low fee currency exchange. A feature is to integrate and combine three, financial services—investment management, credit/debit cards, and a faster, cheaper, alternative currency facility, into one seamless, Financial Management Account system and method.

This service is accessible over the Internet on a password-protected basis, or encrypted link basis, for statements, transactions and trading tools. Small and medium size businesses and individuals (with high net worth, or even more modest means) with a high quality, will have convenient and cost-competitive product that will satisfy their daily investment, travel and business transaction needs. Individual account holders will also have access to the currency conversion features, for performing the operation of converting currencies in sales transactions between respective businesses, as a trading and investment tool, an intermediary in international negotiation processes using different currencies, currency conversion features by way of financial institutions, for example. State of the art systems developed by global payment card associations (e.g. MasterCard, Visa & JCB) and systems in use by private transaction processing companies (e.g. BISYS, FDC, EDS, may be employed as assets of the system and method of the present invention). These systems will ensure the viability of the Financial Management Account to the end users.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
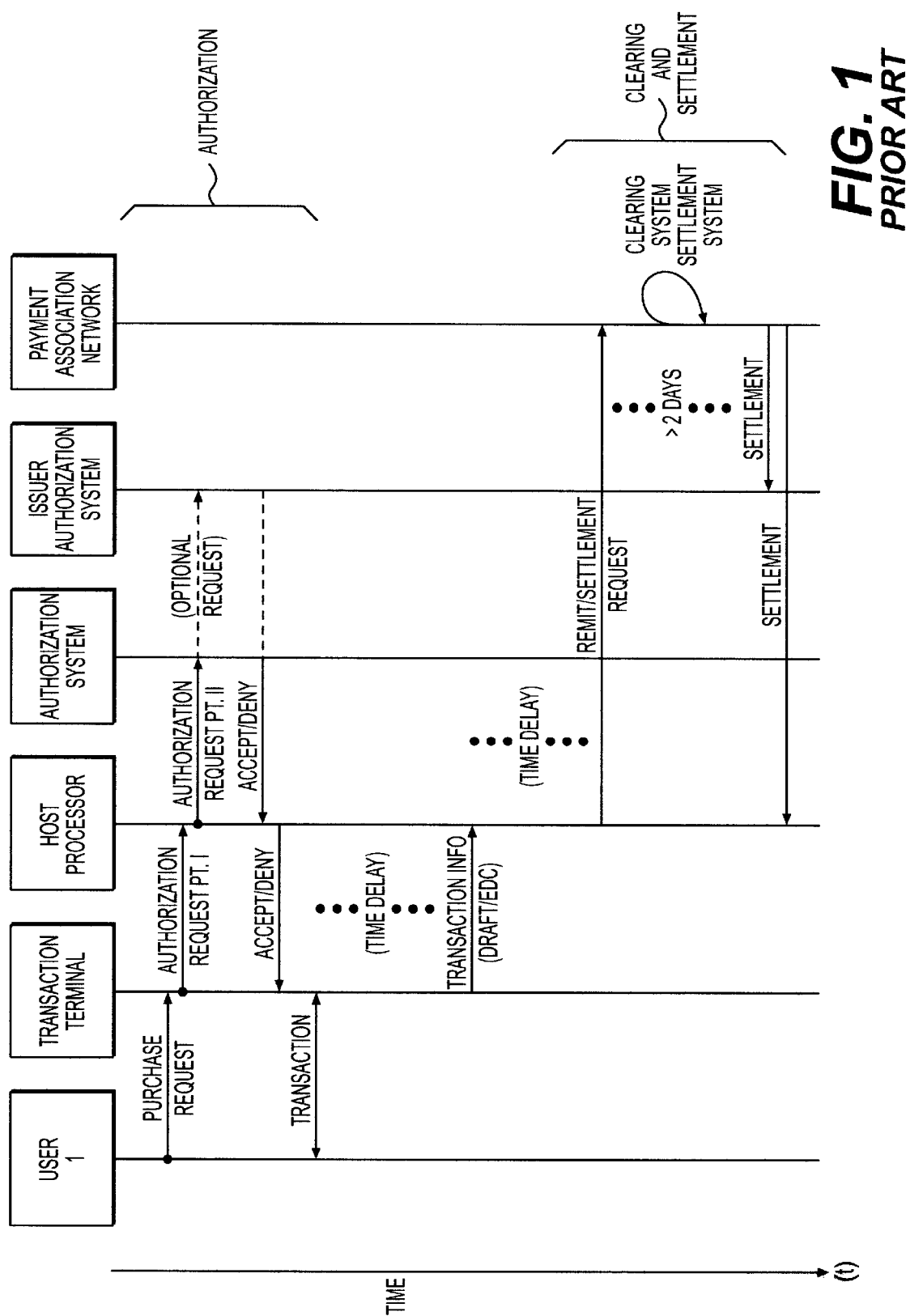
FIG. 1 is a signaling diagram between different entities in a conventional payment system, requiring authorization, and clearing and settlement subprocesses.
Figure 2:
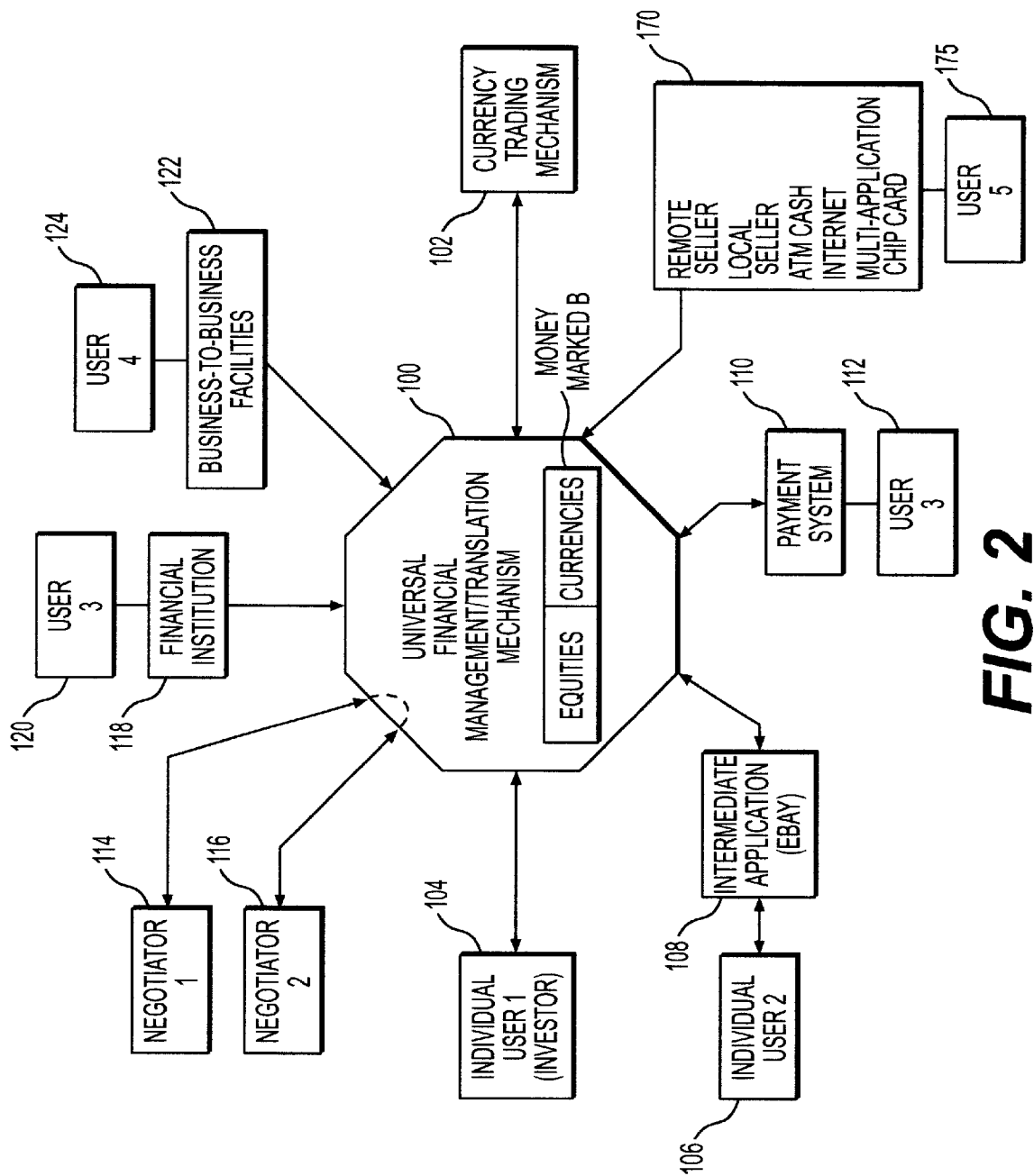
FIG. 2 is a block diagram of a universal financial management/translation mechanism and system according to the present invention.

Referring now to the drawings, wherein like reference numerals designate identical or corresponding parts throughout the several views, FIG. 2 shows a universal financial management/translation mechanism-based system according to the present invention. A feature of the present invention is that a centrally-located universal financial management/translation mechanism 100, that has communications access to one of a variety of different interfaces, is positioned to provide the "price discovery" information that allows customers to use the mechanism to benefit from competitive currency conversion at wholesale conversion rates, with up-to-date currency rate conversion information, facilitating various financial transactions. The universal financial management/translation mechanism 100, includes a first section directed toward managed equity accounts held by different subscribers, and a second section (i.e., a currency section) that is used by particular subscribers as a way for redeeming currency outlays, should currency be needed to be distributed to a particular entity as requested by the user. In addition, relationships with financial institutions 118 for example, will also allow various customers of those financial institutions 118, such as user 3 120, to benefit from the financial services offered by the universal financial management/translation mechanism 100. In the case of a particular subscriber, who creates and initiates an account with the mechanism 100, that particular user will initially populate a currency portion of the individual's account by making a deposit into an account. While the funds are deposited as a certain kind of currency, the specific value of that deposit is converted into a corresponding number of "shares" for use by the user. These funds may be redeemed in a particular currency or perhaps used to purchase shares in a growth and income fund. The funds may also be used to purchase equities managed by the mechanism 100. Alternatively, the deposit may be used to purchase contracts, such as options, derivatives, futures and hedge funds. The mechanism makes a record of the deposit, which is made in a first currency and subsequent transactions are debited and recorded against the deposit. Separate, but related accounts may be held for other currencies. For example, one "sub account" may be opened for U.S. dollars, another "sub account" may be opened for Euros, and a third "sub account" may be opened for British pounds. Clearly, other sub accounts for other currencies traded in volume, such as Yen, may also be used. The investor will receive one consolidated statement, on a periodic basis, with the recorded holdings in each sub account, as well as all transactions and conversions made to/from different currencies.

One connection between the mechanism 100 that is relevant for the conversion process, is to a currency trading mechanism 102, that in one embodiment, is a multi-currency money market fund, managed by a fund manager and employing the services of a currency trader, for the purpose of trading various currencies on a nearly continuous basis. The currency trading mechanism 102 provides updated information regarding wholesale competitive currency exchange rates between various currencies and provides that information on a frequent basis back to the mechanism 100. Communications between the mechanism 100 and the currency trading mechanism 102 may be by way of a secure communication link in the form of wire connection, such as a leased line, or encrypted public line or even a proprietary line. Alternatively, a wireless communications channel may be used, such as by way of low earth orbiting satellites, geostationary satellites, or terrestrial digital and analog communication services. Currency conversions made by the trader on behalf of shareholders is accomplished by the end of that business day in which the shareholder issued a conversion request message.

Individual users such as user 104, may redeem shares in different currencies as an investment tool that is enabled by having timely rate conversion information that corresponds in time to precisely when a user actually redeems the shares. In this way, much like how investors trade equities (e.g., stocks), that same investor may trade currencies, albeit with much more timely information than traditional techniques. Providing the user with real-time rate conversion information (such as through on on-line feed service, like Bloomberg) allows that user to redeem "shares" in a particular currency in synchronization with the user's ability to redeem the shares that same business day, thus having only a short window of time from when the conversion request message was generated until the time the trader was able to make the trade by the end of that business day. User 104 employs a programmable processor-based computer as the tool for communicating with the mechanism 100. This computer may be a personal computer with a terrestrial landline (e.g., PSTN, cable or optical fiber) connection or wireless link (e.g., terrestrial wireless and/or space-based wireless links), portable computer, such as a PALM VIIe, cellular phone pager or other mobile processing device. Investment control is offered with such devices for conventional trading at Charles Schwab as part of the wireless Applications Protocol Forum.

Individual user 2 106 is shown to communication with various intermediate applications 108, such as various e-commerce websites that involve payments within a national or multinational currency or payments in an international currency. For example, the individual user 2 106 may bid on a particular device being offered on at an auction website, such as eBay.com, and upon the successful winning bid by the individual 2 106 will allow the auction application 108, to convert the buyer's currency to the seller's currency at the time the auction closed. Accordingly, individual users need not be concerned with conversion rates, or question whether or not conversion rates will change rapidly from the time the sale is made to the time the individual receives the goods.

Another feature of the system shown in FIG. 2 is that the mechanism 100 serves as a facilitator between international negotiators 114 and 116. The mechanism 100 provides a web-site or other computer-based graphical user interface tool that allows various negotiators who choose to employ the services of the mechanism 100, to present in the negotiator's native currency a particular bid and ask price. Because the mechanism 100 offers wholesale conversion rates with real-time price quotes, the negotiators will have the benefit of seeing precisely how much particular product cost in currency that is native to that individual. In addition, the mechanism 100 will also serves as a facility for distributing the funds, provided the seller is a shareholder in the mutual fund, or has a legal connection with the central mechanism 100.

Another service performed by the mechanism 100, is an alternative currency facility for business-to-business transactions, where foreign currencies are exchanged from one to another. Such global financial transaction facilities include SWIFT, ACH, GIRO, etc. Likewise, certain payments system 110, such as conventional credit cards may also use the facility so that individual user 112 may have payments paid with assets held by the mechanism 100 or accessible by way of the mechanism 100. Another user 124 may use the mechanism 100 by way of the business-to-business facilities 122, as shown in FIG. 2.

User 5 may also employ the services of the mechanism 100 by way of one of a variety of intermediary entities and tools 170. For example, the user 5 175 may make a purchase from a remote seller (such as a mail order purchase, Internet-facilitated purchase), from a local seller or cash retrieval service (such as an ATM) or even by way of a "smart-card" multi-application card having a memory and processor contained therein.

Figure 3:
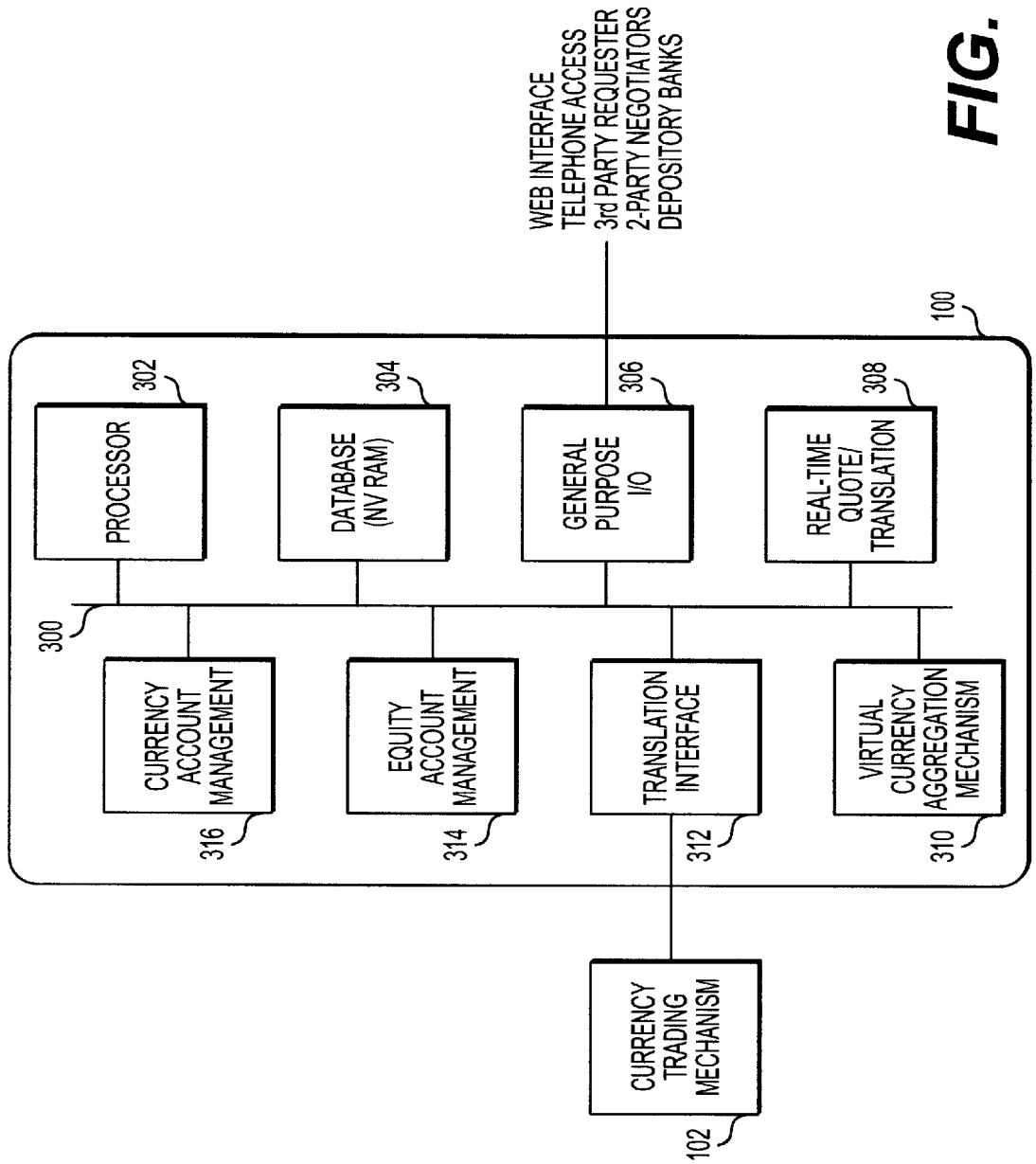
FIG. 3 is a block diagram of the mechanism discussed above in FIG. 2.

FIG. 3 is a block diagram of the mechanism 100, previously shown in FIG. 2. The mechanism 100 includes a bus 300 that interconnects a variety of different computer-based mechanisms hosted within the mechanism 100. The bus 300 interconnects a processor 302, which may be a single processor or multi-processor configured to handle the management of the various mechanisms included within the central mechanism 100. Software performed by the processor 302 is held on the database 304, which may be in the form of non-volatile RAM. In addition, various entries associated with transaction made in both the equities and currency portion of the mechanism 100, are held in the database 304. The database 304 may either be hosted on a magnetic memory, or various types of other memories such as semiconductor memory and either distributed among multiple sites or located at a single site.

The bus 300 also connects the general purpose input/output 306 to various internal interfaces. For example, in an Internet application where the mechanism 100 provides a world wide web homepage interface, the general purpose I/O 306 provides that web interface, as well as telephone, cable or wireless access. In addition, the general purpose I/O provides an ability for third party service providers and two party negotiators as well as depository and other financial institutions to have access to the mechanism 100 as previous discussed. The translation interface 312, handles various communications that exist on an on-going basis with currency trading mechanism 102.

One embodiment of the currency trading mechanism 102 is the multi-currency money market fund that employs currency trading components. Virtual currency aggregation mechanism 310 combines different currency conversion requests (i.e., request messages) that are obtained from different shareholders of a particular fund within a predetermined time, or even on an individual basis, so as to employ the services of the currency trading mechanism 102 for performing those trades on a "wholesale" basis, by aggregating the specific request of individual users, with users that have similar conversion requests. Offering sufficient demand for the services justifies the trading facility offered by the currency trading mechanism 102, thus providing a cost-effective service to shareholders. The translation interface 312 communicates with the real-time translation mechanism 308, that provides real-time up-dates to the users who communicate with the mechanism 100 by way of the web interface, telephone access, and the like.

As previously discussed, shareholders may employ a bifurcated account that includes a currency account (with perhaps several "sub accounts" for different currencies) managed by a currency account management mechanism 316, and an equity account handled by equity account management mechanism 314. "Shares" are transferable between the equities and currency account for each shareholder, in that the "shares" may be used to purchase equities or other securities. As shown, the bus 300 interconnects the two different management schemes 314 and 316, so that based on a user request received by way of the general purpose I/O 306, "shares" in the mutual fund may be exchanged between the currency account management mechanism 316 and the equity account management mechanism 314.

Figure 4:
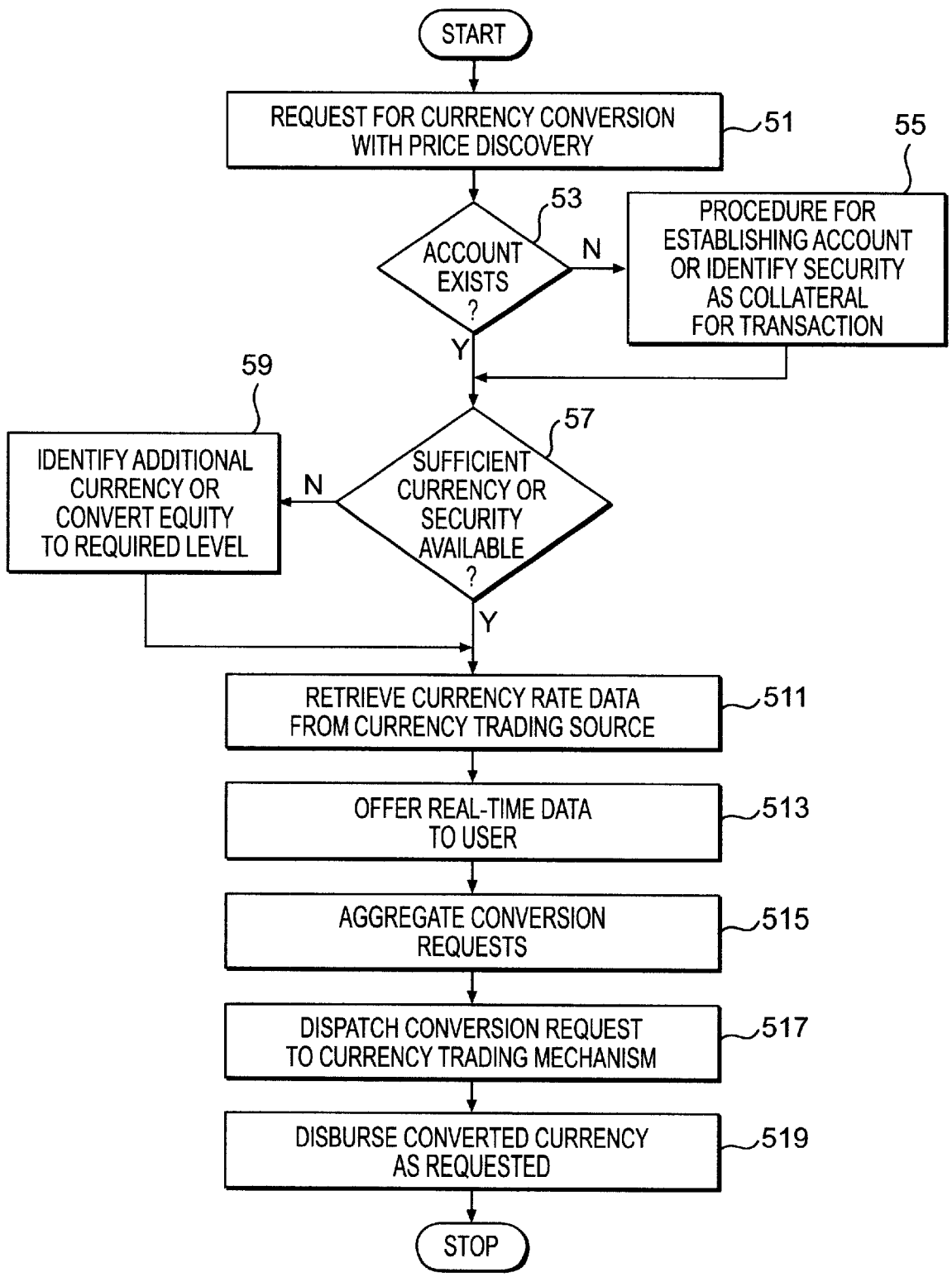
FIG. 4 is a flow-chart of a process that allows for price discovery for a particular currency conversion request, and employs this price discovery operations in order to service that particular currency conversion request.

FIG. 4 is a flow-chart of a process performed according to the present invention. The process begins with step S1 where a user provides a request for currency conversion information, where the request includes a request for information based on "price discovery" (i.e., competitive forces that bid against one another in order to provide the best conversion rate for the user). After the request is received, the process proceeds to step S3 where an inquiry is made regarding whether the account associated with that particular request exists. If the response to the inquiry in step S3 is negative, the process proceeds to step S5 where a procedure is invoked for establishing an account for that particular user or identifying tangible securities of that particular user that may serve as a collateral for this particular transaction. Such securities may be bank accounts held by that individual through various financial institutions having established relationships with the mechanism 100. At the conclusion of step S5, the process flows to the inquiry in step S7, and likewise if the response to the inquiry in step S3 is affirmative, the process also proceeds to step S7.

In step S7 an inquiry is made regarding whether there is sufficient currency or security available to support the requested currency conversion operation. If the response to the inquiry is negative, the process proceeds to step S9 where additional currency or securities are identified so as to support the requested transaction. If necessary, equities held in the equity portion of an individual's account in the mechanism 100 may be converted into currency for purposes in supporting the currency conversion. The process then proceeds to step S11 where the particular currency rate is retrieved from the currency trading source so that the user may be informed of the relevant currency conversion rate. The process then proceeds to step S13 where the mechanism 100 offers the user the real-time data associated with the currency rate information. The process then proceeds to step S15 where the mechanism 100, as well as the currency trading source, may be used to aggregate different currency requests in order to provide "bulk" currency conversions in the trading facility. Once the trade has been completed, the process proceeds to step S17 where a request is dispatched to the currency trading mechanism and then in step S19 currencies associated with the previously preformed currency step, are dispersed to the shareholders in amounts that correspond with the original requests. Then, the process ends.

Figure 5:
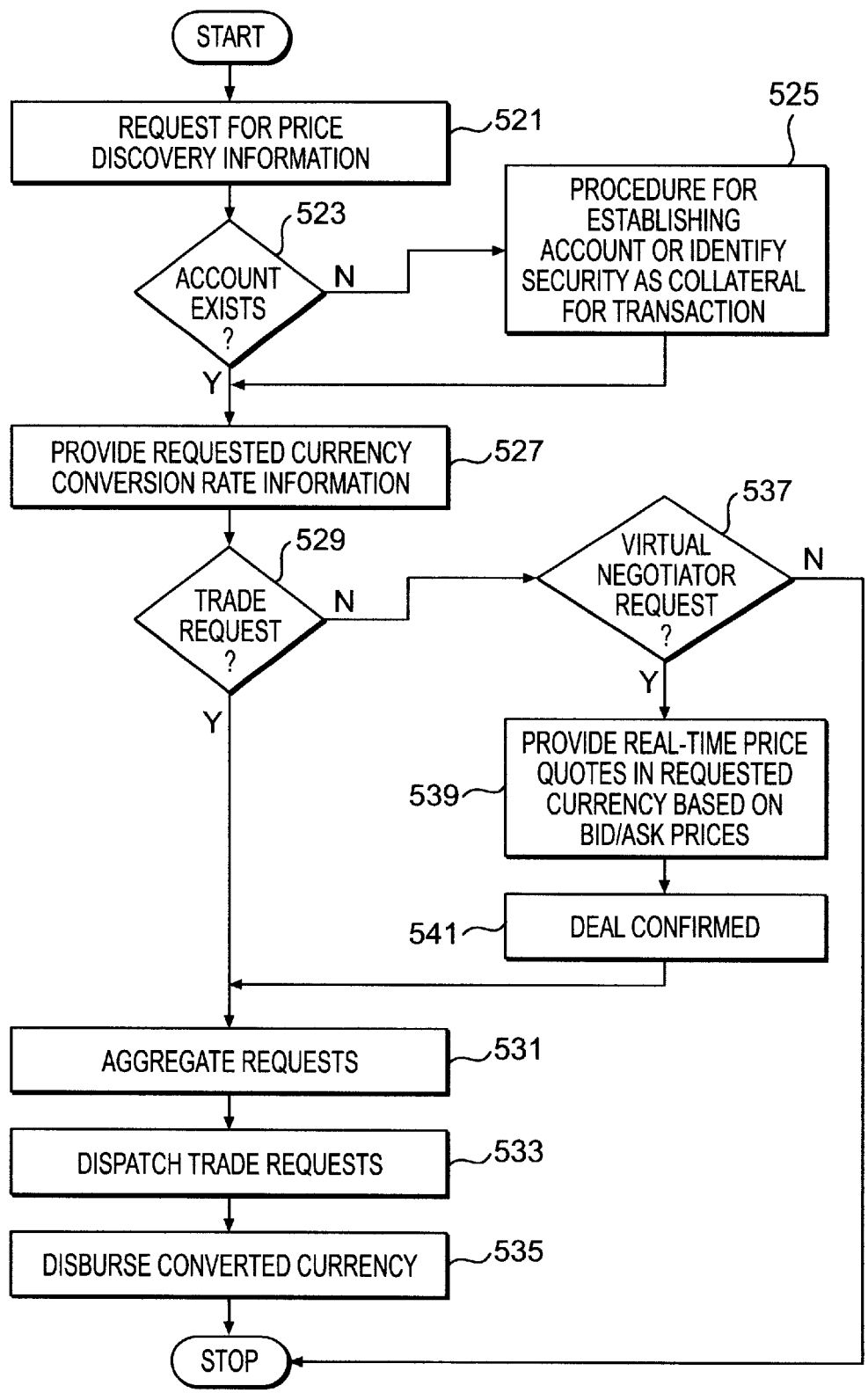
FIG. 5 is a flow-chart of a process that allows for updated currency conversion rate information to be used in facilitating particular international trades.

FIG. 5 is directed to a process for employing the central mechanism 100 for various uses. The process begins in step S21 where a particular user, or agent of the user provides a request for rate conversion information, by way of the price discovery process discussed above. The process then proceeds to step S23 where an inquiry is made regarding whether an account exists either on behalf of that user or the user's agent. If the response to the inquiry in step S23 is negative, the process proceeds to step S25 where a procedure for establishing an account or identifying a particular security for collateral for the transaction is identified so that the inquiry may be continued. Subsequently, the process proceeds to step S27, which is the same as for the case where the response to the inquiry in step S23 if affirmative. In step S27 a request for conversion currency rate is provided followed by a trade request in step S29. If the response to the inquiry in step S29 is affirmative, the process proceeds to step S31 where different currency conversion requests are aggregated within the mechanism 100, and possibly also within the multi-currency money market fund as well. The process then proceeds to step S33 where a dispatch message is sent regarding the trade request, followed by step S35 which results in disbursement of the converted currency. However, if the response to the inquiry in step S29 is negative, the process proceeds to step S37 where an inquiry is made regarding whether the virtual negotiator request has been made by an end user. If the response to the inquiry in step S37 is negative, the process ends. However, if the response to the inquiry in step S37 is affirmative, the process proceeds to step S39 where the parties to the negotiation use real-time price quotes in requesting currency-dependent bid-ask prices that are being proposed by the negotiators. Once a particular deal is confirmed in step S41, the process then proceeds to step S31 for the performance of the subsequent steps S33 and S35 before the process ends. More than two parties may participate in the negotiation, as a competitive bid process.

The following is a discussion pertaining to the use of a multi-currency fund and a money market mutual fund combined with a debit or credit card.

Purchasing Fund Shares: The Distributor sells shares of the funds on a continuous basis. Additional purchases are made through the relevant wire system for the transfer of Disbursable Funds. The financial institution, from which the purchase payment is being sent, has access to the appropriate system. All wire instructions are accompanied by complete information regarding the investor's account, in order to facilitate the prompt and accurate handling of investments.

Shareholder Services: Service activities provided by Service Organizations to shareholders includes: receiving, aggregating and processing shareholder or beneficial owner orders; furnishing shareholder sub-accounting; communicating periodically with shareholders; acing as the sole shareholder of record and nominee for shareholders; maintaining account records for shareholders; answering questions and handling correspondence from shareholders about their accounts; issuing various shareholder reports and confirmations for transactions by shareholders; performing daily investment (sweep) functions for shareholders and performing similar account and administrative services.

Share Redemption: Redemptions optionally are made by wire transfer, in a designated currency of a Fund whose shares are designated in the same currency. A redemption request preferably meets the minimum amount and other requirements for sending currency through the system. Otherwise, proceeds are paid by check mailed to the shareholder. Each shareholder may pre-designate one bank account per Fund to which redemption proceeds can be directed. The value is determined at the time of redemption, and it is made to equal the aggregate net asset value of the Fund shares being redeemed next determined following receipt of the redemption request.

Funds immediately cover a redemption in the currency to be paid out on redemption. Furthermore, the fact that the fund does so, would make a guarantee of principal of each fund meaningless.

For selected customers there is no minimum purchase of fund shares, although fixed or variable share prices may be employed as well.

Benefits of investing for a small and medium size business entity: Small businesses that purchase shares in these funds have access to a faster, cheaper currency facility for select business transactions. In addition, businesses and their employees can use their funds credit card at ATM machines, and conduct business transactions with merchants, both locally and abroad.

Benefits of investing in these funds by individuals: The benefits are the same as the business share class, although these funds' expense ratios will be slightly higher, potentially reducing the dividend and interest to its shareholders. In addition, these funds are an adjunct to their checking account.

Benefit of a payment card issued with the purchase of a minimum of fund shares: A benefit is global access to the multi-currency money market and growth and income funds, via multiple channels. Potentially, the card user could designate specific fund account access via telephone, Internet or other communication allowing more flexibility and control over the account.

Money Market funds have traditionally issued checks or debit cards for redemption of shares. As this product is a multi-currency money market fund, a credit or debit card facilitates the redemption of fund shares, either to change funds, or to complete a business or retail transaction in a currency that is listed in their fund prospectus. The card issuer receives a transaction fee through the an interchange mechanism operated by the card system. Additionally, the funds' Shareholder of Record will be linked to the global payment system, so that a fund shareholder could receive one monthly statement for all transactions.

Issuers of the credit cards: Financial institutions that become Members, either voting or non-voting members, will be the issuers of the credit or debit cards. An investment management company will be the registered investment advisor to the multi-currency money market and growth and income funds.

Record keeping services to the funds' shareholders: The issuer of the credit/debit card will be act as the shareholder of record to parties that receive and use their credit/debit cards. This entity will have a proven infrastructure to ensure that fund payment transactions are completed with virtually a 100 percent success rate.

The processes set forth in the present description may be implemented using a conventional general purpose microprocessor programmed according to the teachings in the present specification, as will be appreciated to those skilled in the relevant arts. Appropriate software coding can be readily prepared by skilled programmer based on the teaching of the present disclosure, as will be apparent to those skilled in relevant arts. The present invention thus also includes a computer-based product which may be hosted in a storage medium and include instruction which can be used to program a computer to perform a process in accordance with the present invention. The storage medium can include, but is not limited to, any type of disk including floppy disk, optical disk, CD ROMs, Magneto optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. A method of implementing a central-based universal financial management system on a computer network comprising the following steps:

(a) providing a financial account management mechanism configured to receive funds into a plurality of individual financial management accounts, each of said individual financial management accounts comprising a money market fund account from an individual investor, wherein an amount of said funds as a first predetermined amount of a first national or multinational currency is recorded in a computer readable memory;

(b) providing an access mechanism configured to enable each of said plurality of individual investors to generate a request message that a second predetermined amount of said funds be exchanged for a second national or multinational currency at a near wholesale currency exchange rate by aggregating each request message from said plurality of individual investors to form a bulk request; each of said request messages includes an information request based on a foreign exchange price discovery of a real time wholesale currency conversion rate, wherein said foreign exchange price discovery is achieved by utilizing competitive forces that bid against each other to provide the lowest conversion rate for said individual investors;

(c) providing a trading interface configured to connect said financial account management mechanism to an external currency trading mechanism, said trading interface forwards each of said request messages without charging each of said individual investors a fee to said external currency trading mechanism which performs a conversion transaction based on said foreign exchange price discovery of the real time wholesale currency conversion rate external to said money market fund and based on price discovery that converts said second predetermined amount of said first national or multinational currency at said near wholesale conversion rates and reports said conversion to said financial account management mechanism once the conversion transaction is complete, wherein said financial account management mechanism being configured to record a reduction by said second predetermined amount of said first national or multinational currency in each of said accounts owned by said plurality of individual investors and said currency conversion transaction occurs on a same business day as when each investor sends the request message.

* * * * *